(12) United States Patent
Su et al.

(10) Patent No.: US 10,298,789 B2
(45) Date of Patent: May 21, 2019

(54) SYSTEM AND METHOD FOR FIELD CUSTOMIZATION OF MULTIFUNCTION PERIPHERALS

(71) Applicants: Kabushiki Kaisha Toshiba, Minato-ku (JP); Toshiba TEC Kabushiki Kaisha, Shinagawa-ku (JP)

(72) Inventors: William Su, Riverside, CA (US); Allen Ma, Irvine, CA (US); Jia Zhang, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/911,663

(22) Filed: Mar. 5, 2018

(65) Prior Publication Data
US 2018/0198932 A1 Jul. 12, 2018

Related U.S. Application Data

(63) Continuation-in-part of application No. 15/455,348, filed on Mar. 10, 2017, now Pat. No. 9,912,826.

(60) Provisional application No. 62/334,634, filed on May 11, 2016, provisional application No. 62/491,553, filed on Apr. 28, 2017.

(51) Int. Cl.
*H04N 1/00* (2006.01)
*G06F 3/12* (2006.01)

(52) U.S. Cl.
CPC ....... *H04N 1/00506* (2013.01); *G06F 3/1205* (2013.01); *G06F 3/1253* (2013.01); *G06F 3/1285* (2013.01); *H04N 1/00411* (2013.01); *H04N 1/00511* (2013.01); *H04N 2201/0094* (2013.01)

(58) Field of Classification Search
CPC ........... H04N 1/00506; H04N 1/00411; H04N 1/00511; H04N 2201/0094; G06F 3/1205; G06F 3/1253; G06F 3/1285
USPC ....................................................... 358/1.15
See application file for complete search history.

(56) References Cited

U.S. PATENT DOCUMENTS

| | | | |
|---|---|---|---|
| 2005/0262394 A1* | 11/2005 | Yasukawa | G06F 11/0733 714/23 |
| 2009/0091770 A1* | 4/2009 | Kano | H04N 1/00132 358/1.1 |
| 2011/0102836 A1* | 5/2011 | Kawaura | G06F 3/1204 358/1.15 |
| 2012/0079081 A1* | 3/2012 | Parks | G06F 3/1204 709/220 |
| 2014/0195921 A1* | 7/2014 | Grosz | G06F 3/1242 715/738 |
| 2015/0135108 A1* | 5/2015 | Pope | G06K 9/00006 715/767 |
| 2017/0310831 A1* | 10/2017 | Kodimer | H04N 1/00344 |

\* cited by examiner

*Primary Examiner* — Allen H Nguyen
(74) *Attorney, Agent, or Firm* — Ulmer & Berne LLP

(57) ABSTRACT

A system and method provides for automated selection and installation of device interfaces based a location of a device or a time of day at the location of the device. A current space-time state of a digital device is determined and used to select image data corresponding to at least one of a plurality of alternative user interface images or interface sets.

20 Claims, 10 Drawing Sheets

*TopAccess*　　　　　　　　　　　　　　　　　　　　　　　　　　　　　　　　e-Filing
　　　　　　　　　　　　　　　　　　　　　　　　　　　　　　　　　　　　　Logout

| Device | Job Status | Logs | Maintenance | Registration | Counter | User Management | Administration |

Setup | Security | Maintenance | Registration | AirPrint | Application

Application
Application List | Settings

Copy App  [Save] [Cancel]

☑ Automatically Send Application Diagnostic Data — 404
Allow the application to send diagnostic information to Toshiba Registration cloud server improves the quality of apps
The diagnostic data does not contain personally identifiable information Scan Quality ☐ Show options to the user      Page Scanning ☐ Show options to the user — 416
○ 200 DPI                                    ☐ Scan both sides of pages
○ 300 DPI                                    ☐ Remove Blank Pages
○ 400 DPI — 408

Color Mode ☐ Show options to the user     Finishing ☐ Show options to the user — 420
● Color                                    ☐ Staple
○ Gray Scale                               ☐ Hole Punch
○ Black Only File Type ☐ Show options to the user — 412
● PDF
○ TIFF
○ JPG Scan Confirmation — 424
☑ Print Confirmation Receipt Send Confirmation E-mail to
☐ Logged in User
☐ Other E-mail Addresses

[Enter up to 5 comma separated e-mail addresses]

Install Software                    | Top | Help |          ©2016 TOSHIBA TEC CORPORATION All Rights Reserved.

*TopAccess*  e-Filing  Logout

| Device | Job Status | Logs | Registration | Counter | User Management | Administration |
| Setup | Security | Maintenance | Registration | AirPrint | Application | |

Application
Application List | Settings  ←504

| | Application Name | Version | Manual Operation | Start Type | Uninstall |
|---|---|---|---|---|---|
| | Copy App | 1.0.0 | | | Uninstall |
| | eConnect Vertical | 2.6.2 | | | Uninstall |
| | e-BRIDGE Plus for Google Drive ™ | 0.5.4 | | | Uninstall |
| | e-Bridge Plus for Dropbox | 0.5.5 | | | Uninstall |
| | e-BRIDGE Plus for OneDrive ® | 1.1.2 | | | Uninstall |
| | BG with Setting Dis V1.0.0 | 1.0.0 | Start  Stop | Auto  Manual | Uninstall |
| | App Shop | 1.0.0 | | | Uninstall |
| | Meter Collection | 1.3.1 | Start  Stop | Auto  Manual | Uninstall |
| | eConnect for Box | 1.3.6 | | | Uninstall |
| | Elevate | 2.6.2 | | | Uninstall |
| | QR Discovery | 1.0 | | | Uninstall |
| | Omikuji | 1.0 | | | Uninstall |
| | StackSend | 1.0.0 | | | Uninstall |
| | 308 home with setting  1.1.0 | 1.0.0 | | | Uninstall |
| | Secure PDF | 1.0.0 | | | Uninstall |

| Install Software |

| Top | Help |

©2016 TOSHIBA TEC CORPORATION All Rights Reserved.

SYSTEM AND METHOD FOR FIELD CUSTOMIZATION OF MULTIFUNCTION PERIPHERALS

CROSS-REFERENCE TO RELATED APPLICATIONS

This application claims priority to U.S. patent application Ser. No. 15/455,348 filed Mar. 10, 2017 which claims the benefit of U.S. Provisional Application No. 62/334,634, filed May 11, 2016, both of which are incorporated herein by reference.

TECHNICAL FIELD

This application relates generally to customization of multifunction peripherals. The application relates more particularly to field or end user customization of multifunction peripherals to specific needs or constraints of different businesses.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

MFPs are typically provided with a fixed set of functions that are available to device end users. In addition to printing, copying, scanning and e-mailing, the device may add further options. Copying or printing may involve hole punching or stapling. Printing may be in black and white, or in color. Scanning may be to an image file or to a text-inclusive file via optical character recognition. These, and other options, are typically selectable by device users via a user interface, such as a touchscreen display integrated into an MFP.

SUMMARY

In accordance with an example embodiment of the subject application, a system and method for customized multifunction peripherals includes a processor and associated memory storing image data corresponding to a plurality of alternative user interfaces. A current space-time state of a digital device is determined and used to select image data corresponding to at least one of the plurality of alternative user interface images.

BRIEF DESCRIPTION OF THE DRAWINGS

Various embodiments will become better understood with regard to the following description, appended claims and accompanying drawings wherein:

FIG. 4 is a screenshot of an example embodiment for administrative customization of applications;

FIG. 5 is a screenshot of an example embodiment for administrative customization of applications;

DETAILED DESCRIPTION

Figure 1:
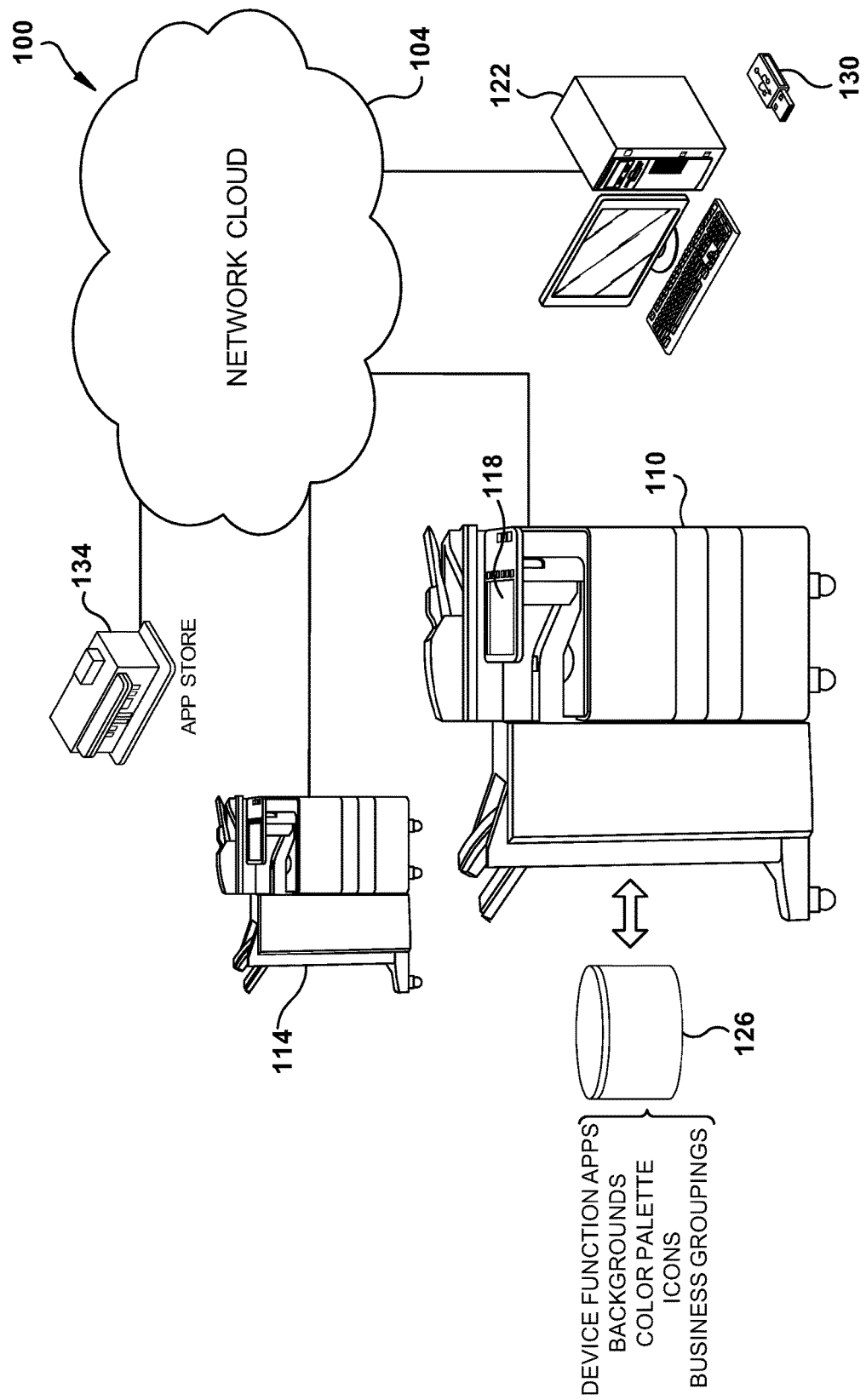
FIG. 1 is an example embodiment of an MFP network.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

MFPs are increasingly powerful and capable devices. With such increases comes increasing complexity of device-user interaction. There may be a substantial number of menus generated on the MFP display which may be hierarchical with many possible layers. Users must learn to navigate these menus and controls. A typical MFP user interface design will have most frequently used functions at a top, or high level menu. Less popular device functions can be difficult to find, as well as time consuming to locate. Some users are required to navigate complex menu structures to access less popular functions that they use frequently.

Certain businesses may have particular and frequent need for certain MFP functions which are not needed by other businesses. In these situations, device users may be frequently required to spend considerable time at an MFP user interface to complete their document processing tasks. In businesses with devices that differ from one another, there may be different steps that need to be taken with one device than those required to taken to complete the same job on another device available to them.

In addition to the forgoing, various businesses often have a set of forms that they use regularly. By way of example, an auto dealership may have forms for vehicle sale, vehicle lease, vehicle rental or vehicle purchase. They may also have forms for credit applications, license plate orders, insurance information, etc. An auto salesperson may have their own forms folder and grab a master of a needed form for photocopying for a customer. This requires additional steps for the salesperson. It also provides room for error or inconsistencies since one salesperson may have a different or outdated version of a form in their forms folder. Additionally, certain forms may need to be completed in duplicate, requiring two copies requiring the salesperson to recall that or make a trip back to the MFP. In addition, certain customer data may be sensitive, and even subject to privacy protection under the law, such as personal information that may appear in a credit application.

Other professions will have their own MFP device needs that are markedly different than those of other businesses. The legal profession, for example, may need forms for subpoenas, complaints, proof-of-service and invoices. The medical profession may need forms for patient consent, writing of prescriptions, patient information questionnaires or patient insurance information. The legal profession and the medical profession provide examples of businesses that need to maintain very high levels of confidentiality. Failure to do so may comprise a lawyer's attorney-client privilege. Failure to do so in the medical profession may result in a violation of confidentiality requirements of the U.S. Federal Health Information Portability and Accountability Act (HIPAA), leaving a potential for criminal or civil liability for breaches. Use of improper or outdated forms can result in losses in legal proceedings or patient harm in medical situations. Of course, these can also result in malpractice litigation.

Example embodiments herein provide a system and method for customization of MFPs by end users or system administrators. Functions specific to a particular business can customized to be more readily accessible on MFP interfaces which may be on a user interface of a device itself, communicated by a networked device via a web interface, or built in whole or in part within a driver, such as a printer driver, that is called on a user device. Certain functions may be made unavailable to device users, such as color printing or color copying to avoid toner or ink expenses. By way of further example, an administrator may also implement mandatory device functions, such as by automatically encrypting all e-mails. The administrator may also provide for a customized interface with the company color scheme and company logo. The administrator may also tailor menu hierarchy to have functions of specific or frequent needs placed in a more readily accessible location. As a further benefit, the MFP stores electronic documents, such as forms or templates, for uniform use by employees. In addition to the forgoing, the subject application includes example embodiments wherein a business obtains an MFP device with pre-stored libraries of forms, controls, menus or the like, which are generically in use by other businesses of the same type.

By way of example, the MFP suitably arrives to a business pre-populated with settings, menus, or electronic documents specific to different businesses. For example, there may be a default administrator setup choice for "Legal Profession," which includes legal forms, legal documents, brief templates and blank time slips. It may also include address information for various courts or governmental agencies. Thus, all or some of the law firm's needs may be setup immediately. The administrator may then add or replace electronic documents, such as by uploading or scanning from paper. They may also add needed device functions not appearing in the standard legal setup. They may also add or modify menu structures, as well as customize colors, fonts, resolution, etc. They may also import their firm logo so that it appears on the user interface. This is suitably done via a portable data device, such as USB drive, CD or DVD, via a network connection or by scanning a paper document bearing the logo. The administrator may also export and replicate this interface on other MFP devices in use by the business.

In accordance with the subject application, FIG. 1 illustrates an example embodiment of an MFP network 100 that includes one or more MFPs, illustrated by MFPs 110 and 114. Network 104 is suitably comprised of a local area network (LAN) or a wide area network (WAN) which may comprise the global Internet, or any suitable combination thereof. A system administrator or other user can access MFP control via any suitable user interface, such as an integrated user interface 118 or remotely, such as via workstation 122. While workstation 122 is illustrated as a wired computer, it will be appreciated that any suitable data device, including smartphones, tables, notebook computers, or the like, with network connections that are wireless or wired, may be used. Remote device interfacing is suitably done by accessing an MFP via a network address, such as an internet protocol or IP address. Access may be directly through a web interface, and may include tools such as TOPACCESS from Toshiba America Business Solutions, Inc.

MFP 110 is provided with data storage 126 for electronically storing data corresponding to available device function applications, display backgrounds, color palettes, icons, business groupings, etc.

Additional applications that are available to control MFPs may also be added. They may be physically transported to the MFP via a portable data device such as flash drive 130 or any other suitable data transfer mechanism including BLUETOOTH, near field communication (NFC), optical, CD, DVD, wireless or wired network, etc. Applications may also be purchased from an application store, such as App Store 134, suitably via network cloud 104.

Figure 2:
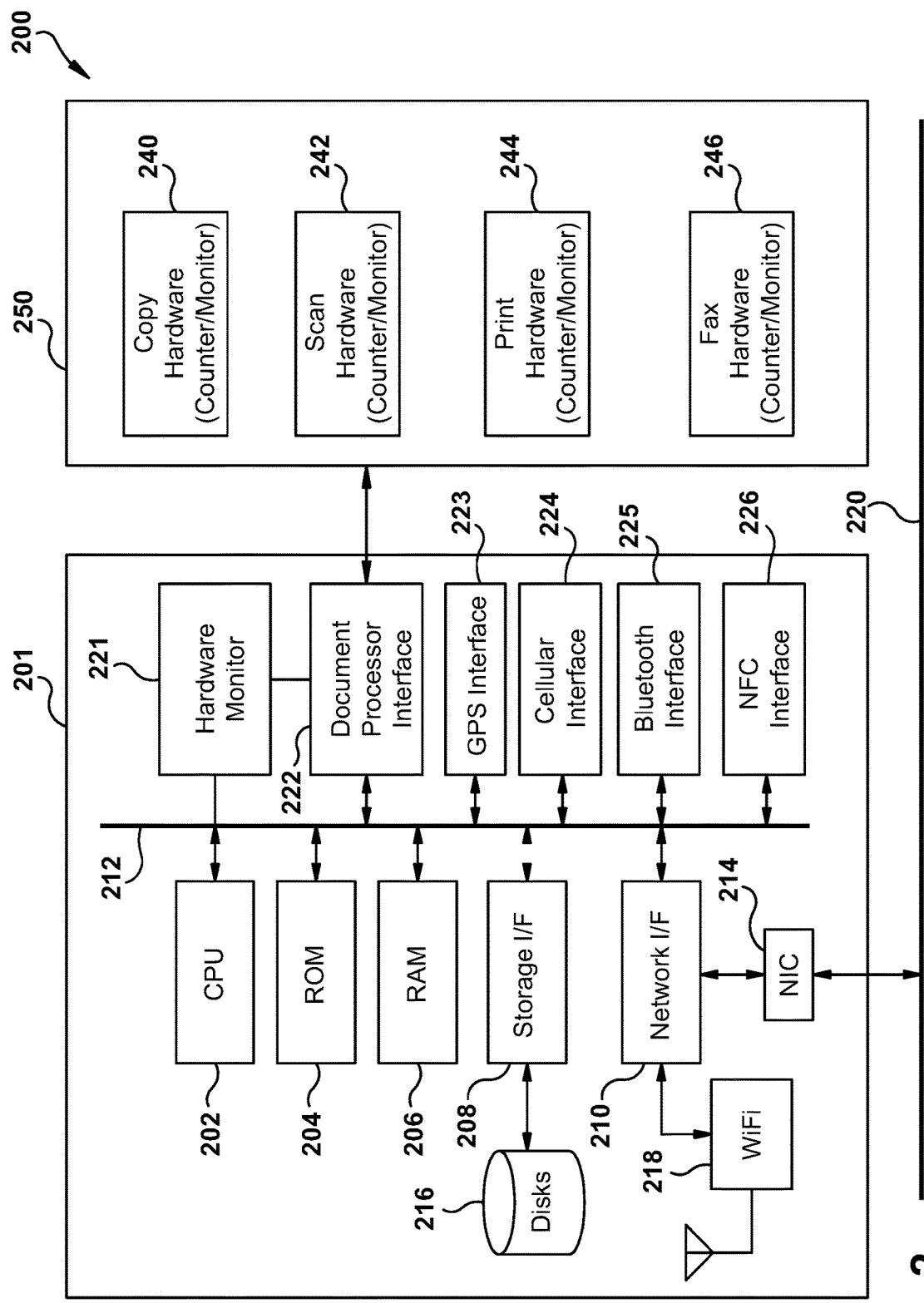
FIG. 2 is an example embodiment of a document rendering system.

Turning now to FIG. 2, illustrated is an example embodiment of a document rendering system 200 suitably comprised within an MFP, such as with MFPs 110 and 114 of FIG. 1. Included is controller 201 comprised of one or more processors, such as that illustrated by processor 202. Each processor is suitably associated with non-volatile memory such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include GPS, Wi-Fi, Bluetooth, NFC, wireless universal serial bus (wireless USB), satellite, and the like. Example wired interfaces include Ethernet, USB, IEEE 1394 (FireWire), Apple Lightning, telephone line, or the like. Interfaces for example wireless connections include GPS interface 223, cellular interface 224, Bluetooth interface 225 and near filed communication (NFC) interface 226.

Processor 202 can also be in data communication with any suitable user input/output (I/O) interface which provides data communication with user peripherals, such as displays, keyboards, mice, track balls, touch screens, or the like. Hardware monitor 221 suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware. It will be understood that MFP functional units 250 are suitably comprised of intelligent units, including any suitable hardware or software platform.

Figure 3:
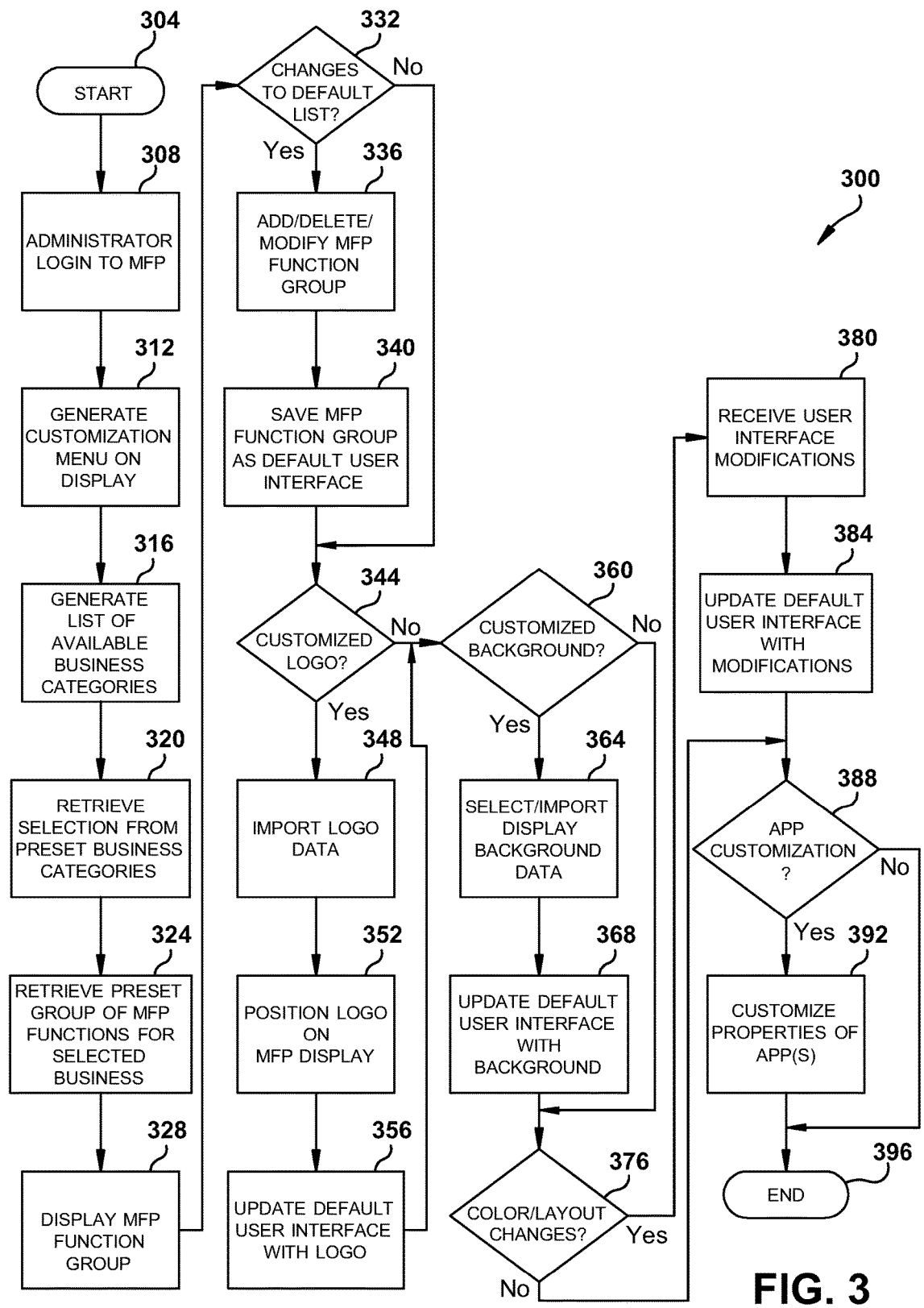
FIG. 3 is a flowchart of an example embodiment for providing a business customizable MFP.

FIG. 3 illustrates a flowchart 300 of an example embodiment for providing a business customizable MFP. The process commences at block 304 and proceeds to block 308 wherein an administrator suitably logs into the MFP, either on the MFP user interface or via a remote terminal. A customization menu is displayed to the administrator at block 312 and a list of available business categories displayed at block 316. The administrator's selection of an available category is received at block 320. Next, a group of preset MFP functions, suitably comprised of applications that can be individually selected or selected in groups, is retrieved from storage at block 324 and displayed to the administrator at block 328. Functions may be retrieved that have been preselected to be associated with a business category or type previously selected by the administrator. If a change is to be made as determined at block 332, then the administrator's changes are made at block 336, saved to the default user interface at block 340, and a check is made at block 344 if a customized logo is to be added for displaying on the MFP user interface. If no changes to the function list are determined at block 332, progress goes directly to the logo change check of block 344.

If the administrator chooses to add a logo at block 344, then logo data is imported into the MFP at block 348 by physical media, wireless connection, wired connection or via a network connection. The administrator positions the logo on a display screen or screens at block 352 and the MFPs default user interface updated accordingly at block 356. A check is then made at block 360 to determine whether a customized background is to be used. Progress to block 360 is direct from block 344 if no customized logo is to be used.

If a customized background is selected at block 360, then it is set at block 364 using either already available options on the MFP or imported background data. The default user interface is updated accordingly at block 368 and then a determination as to whether any changes to the MFP user interface color or layout is made at block 376. Progress is made directly from block 360 to block 376 if no changes to the MFP user interface background are selected.

If color or layout changes are selected in block 376, then the modifications are received at block 380 and the default user interface is stored accordingly at block 384. Next a check as to whether application customization is to be made is completed at block 388. If no color or layout changes were determined at block 376, progress is directly to block 388 for the check for customized applications. If customized applications are to be made at block 388, this is accomplished at block 392 and the process ends at block 396. If no application customization is determined at block 388, the process ends thereafter at block 396.

Turning now to FIG. 4, illustrated is an example embodiment of a screenshot 400 for administrative customization of applications. In this example, the administrator can configure application settings, such as scan quality at 404, color mode at 408, output file type at 412, page scanning at 416 and finishing at 420. The administrator may choose whether a scan confirmation is to be sent at 424.

FIG. 5 illustrates an example embodiment of a screenshot 500 for administrative customization of applications. In the illustrated example, a list of available applications appears at 504, which applications can be installed/uninstalled or modified.

Figure 6:
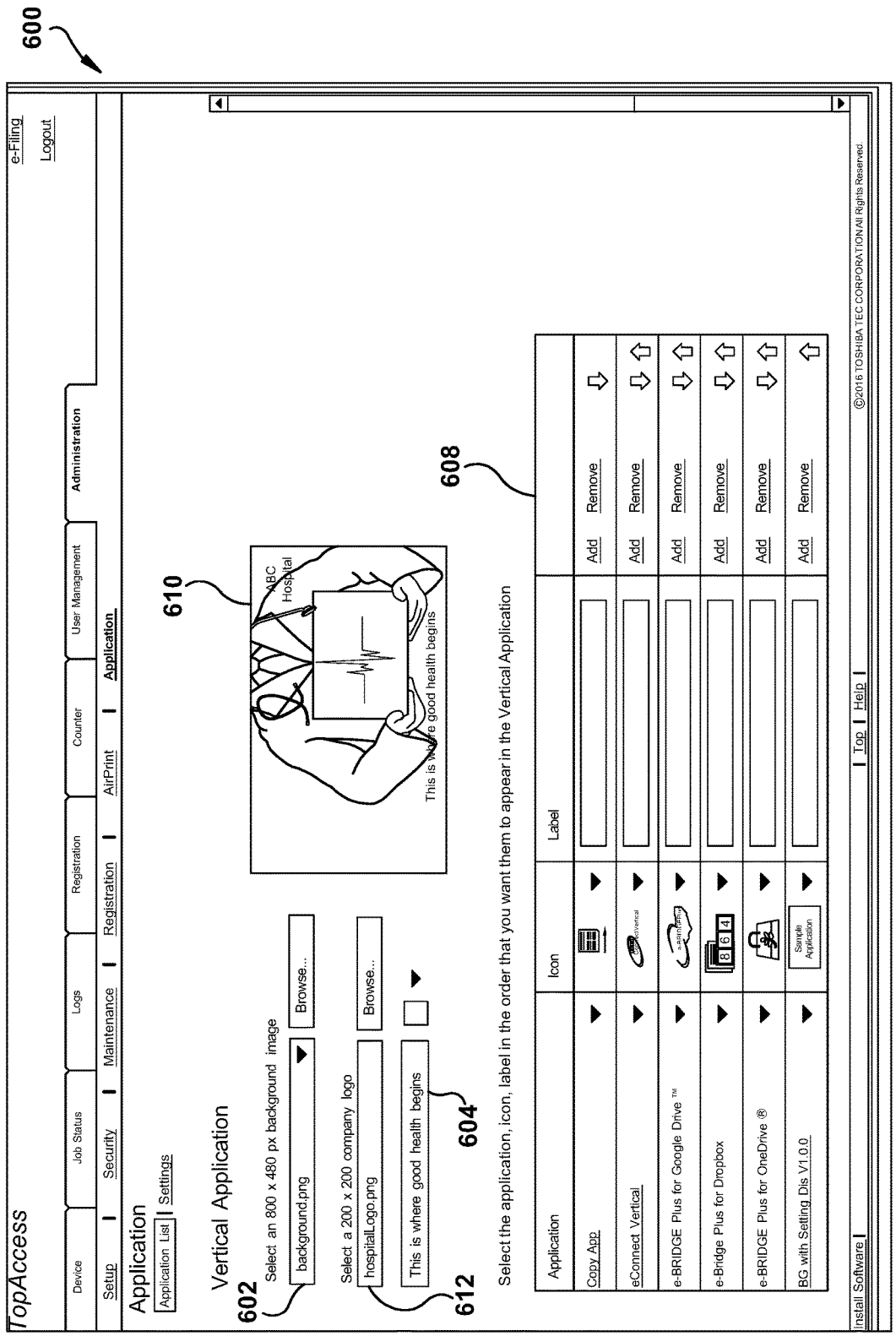
FIG. 6 is a screenshot of an example embodiment for administrative customization.

FIG. 6 illustrates an example embodiment of a screenshot 600 for further administrative customization. The vertical application (or UI Customization) is designed to contain one or many installed apps. Additionally, the UI is configurable by the administrator. Possible customizations include the following. Customizations suitably include selects from a set of pre-stored background images or an uploading background image at 602, add a tag line and select a font color at 604, select among the available (installed) applications and change their order or positions of appearance or add an application tag label at 608, or add a company logo at 612.

Figure 7:
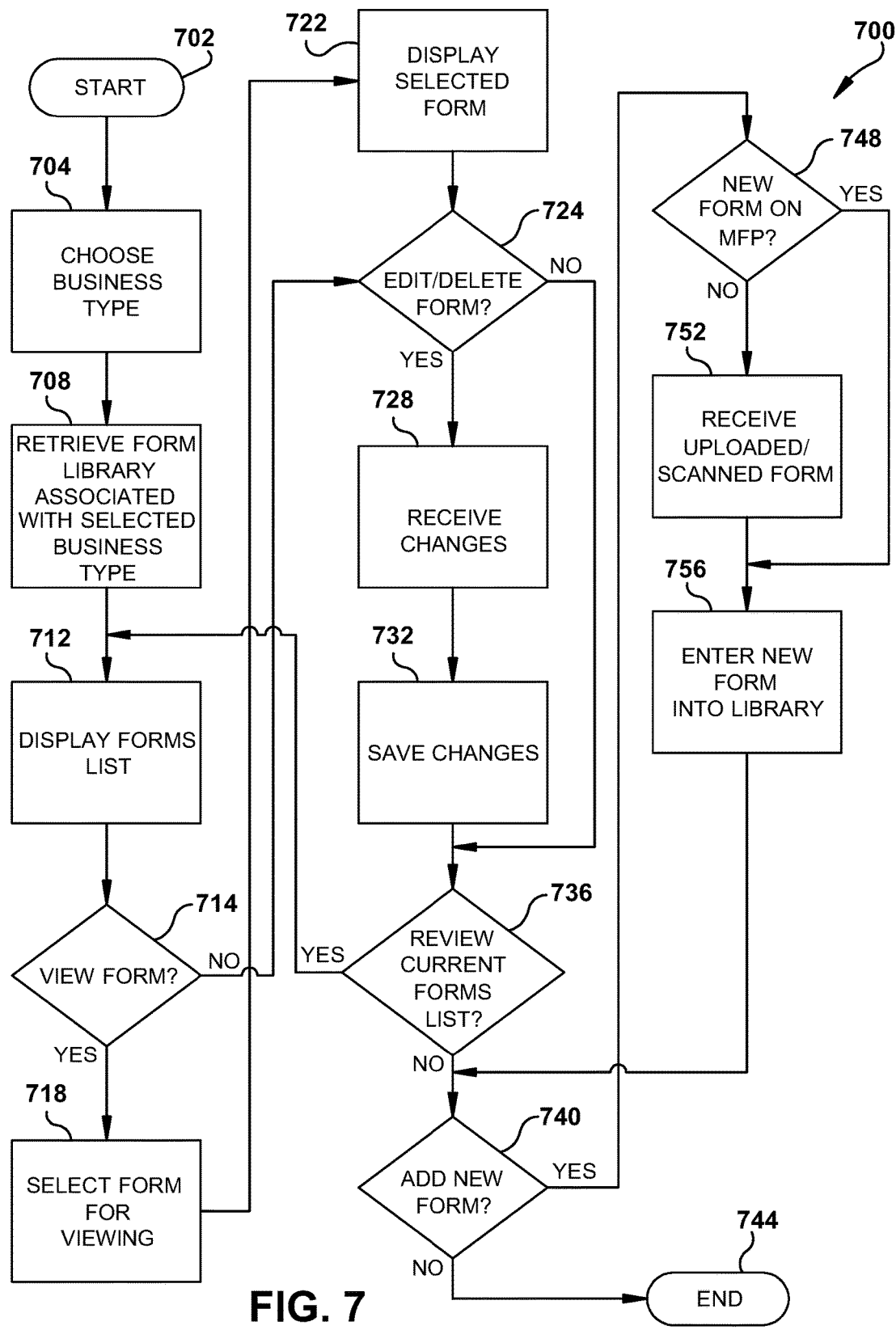
FIG. 7 is a flowchart of an example embodiment of MFP customization relative to available forms.

Referring next to FIG. 7, illustrated is a flowchart 700 of an example embodiment for NFP customization relative to available forms. The process starts at block 702 and proceeds to block 704 wherein a business type is selected from available options by an administrator. A form library associated with a selected business type is retrieved at block 708 and a listing of forms displayed at block 712. The administrator chooses whether to view a form at block 714. If so, the administrator selects a form for viewing at block 718 and display the selected form at block 722. The administrator chooses whether to delete or edit the form at block 724. If no form is selected for viewing at block 714, the process progresses directly to block 724.

If the administrator chooses to edit or delete a form at block 724, changes are received at block 728 and saved at block 732 and the process progresses to block 736. If the administrator did not choose to edit or delete a form at block 724, the process progresses directly to block 736. If the administrator wishes to review the list again at block 736, the process returns to block 712. If not, the administrator chooses whether a new form is desired at block 740. If no new form is needed, the process terminates at block 744. If so, a check is made at block 748 as to whether the new form exists on the MFP, such as a form associated with another business library. If not, the new form is either uploaded digitally or scanned on the MFP scanner at block 752. If the new form is available on the MFP, or if the new form has been uploaded or scanned, the new form is entered into the default library at block 756 and the process returns to block 740 to determine if any other new forms are desired.

In certain situations, it would be helpful to have an MFP automatically determine one or more interface customizations. In an example embodiment, a likely MFP interface is determined in accordance with a location into which an MFP is placed.

Figure 8:
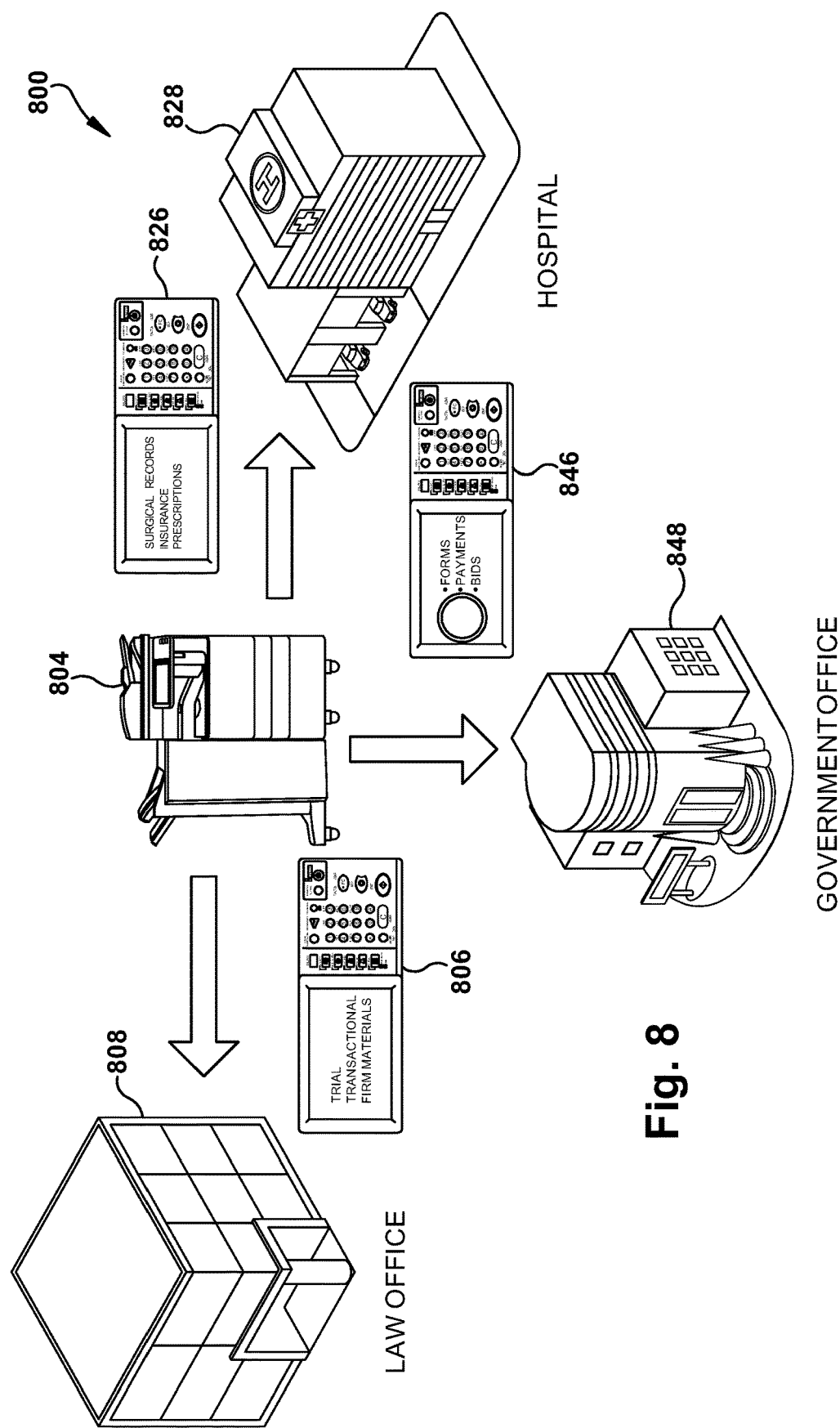
FIG. 8 is an example embodiment of a system for loading of device interfaces.

FIG. 8 illustrates an example embodiment wherein one or more device user interfaces may be automatically loaded when an MFP device is moved to a particular premises or location. It is possible to determine a location of a portable data device by several different or complementary means. One such means relies on receipt of global positioning system (GPS) signals into a GPS input on the device from which its position can be calculated. Another means of location is via a cellular data connection. Rough location can be determined by knowing a location of a cell tower to which a cell phone is connected. Further refinement can be achieved by knowing a particular sector wherein the cell phone is connected. A cell tower may radiate three, 120° sectors in a horizontal, circular pattern. Still further refinement can be made by knowing a signal strength between the cell tower and the cell phone to approximate a distance between them. Still further refinement can be made by triangulation methods using multiple cell towers.

Other means for device location may rely on similar properties associated with connection to a wireless hotspot, a near field communication (NFC) signal, a Bluetooth signal or a beacon signal, such as with iBeacon technology from Apple, Inc. or Bluetooth low energy (LE) beacons.

Still further refinement of location can be accomplished using triangulation methods using multiple wireless connections with any of the afore-noted systems.

In the example embodiment of FIG. 8, a position based default interface selection system 800 includes MFP 804 that includes two or more business specific interface options, including interface 806 for law office 808, interface 826 for hospital 828 and interface 846 for government office 848. When MFP 804 is moved to any premises, a detection of its location is made. A lookup is suitably completed at a map database with the location of the MFP 804, such as GPS coordinates, latitude/longitude coordinates, or the like. The business where the MFP 804 is located is identified and a corresponding default interface is selected and installed. If available, additional information such as a discernable business name, can also be used to further fine tune the default interface once it is determined, such as adding a company name or logo automatically as a background watermark on one or more screens of the determined default interface. Further interface adjustment and refinement can be done manually in the manner detailed above.

Figure 9:
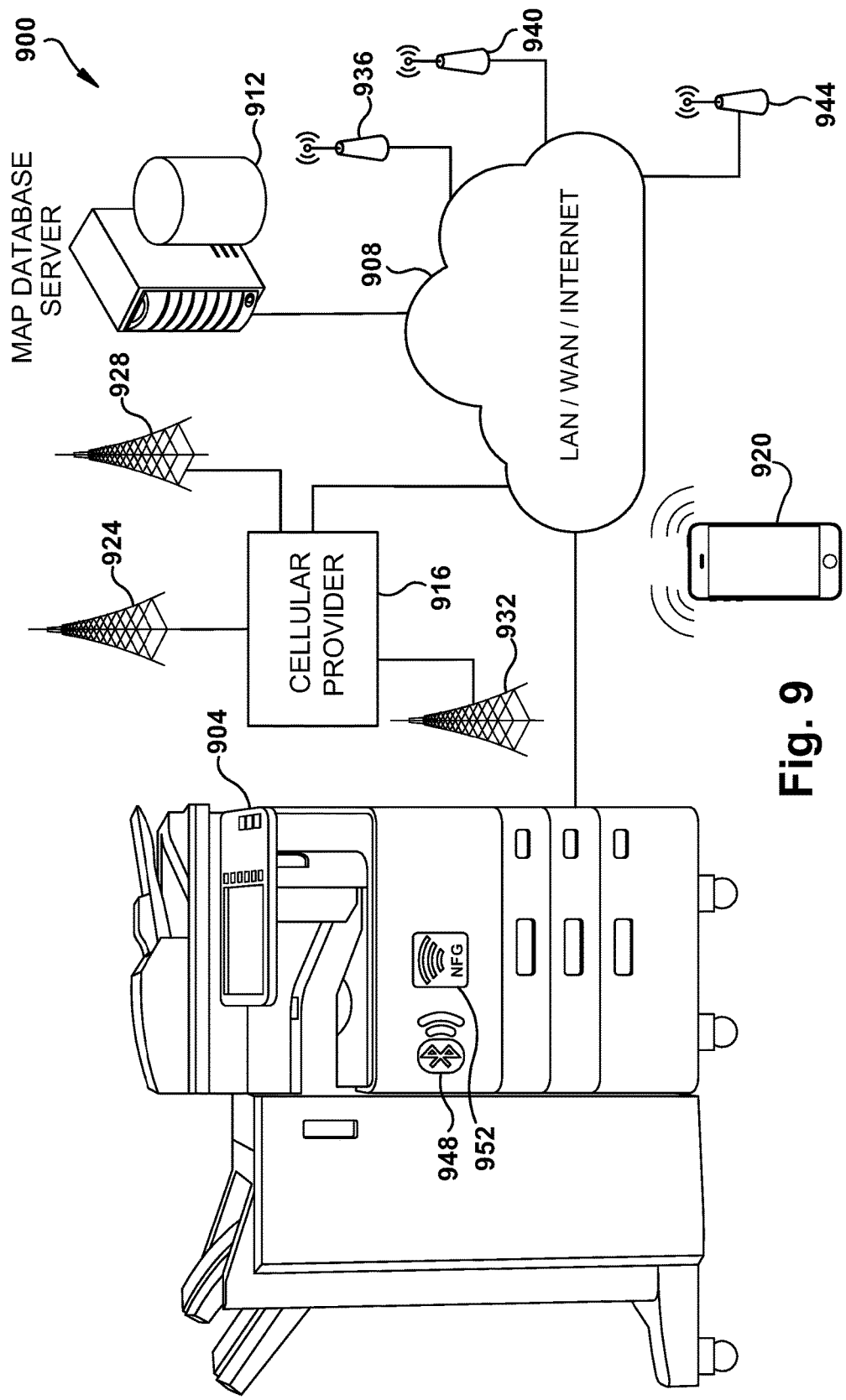
FIG. 9 is an example embodiment of a system for selection of a default user interface based on device location.

In accordance with the subject application, FIG. 9 illustrates an example embodiment of a system 900 for selection of a default user interface based on device location. MFP 904 is suitably provided with a network interface to network 908, suitably comprised of a local area network (LAN), a wide area network (LAN) which may comprise the Internet, or any suitable combination thereof. Also connected to network 908 are one or more servers, such as map database server 912. Example map servers include Google Maps, Bing Maps or Apple Maps. One or more wireless data providers, such as cellular provider 916 facilitate communication with a portable digital data device, such as smartphone 920. Cellular service is provided via cell towers, such as cell towers 924, 928 and 932. Location of MFP 904 can be made using the portable digital data device in accordance with connection with one or more cell towers 924, 928 932 as noted above. For example, the smartphone 920 can determine location using the cell tower 924, 928, 932 and transmit location data to the MFP 904.

Wireless data connection with MFP 904 is also suitably via one or more Wi-Fi hotspots, such as via hotspots 936, 940 and 944. Location of MFP 904 can be made in accordance with connection with one or more hotspots 936, 940, or 944 as noted above. MFP 904 is suitably provided with one or more wireless data exchange devices, such Bluetooth 948 or NFC 952 facilitating determination of its location.

Figure 10:
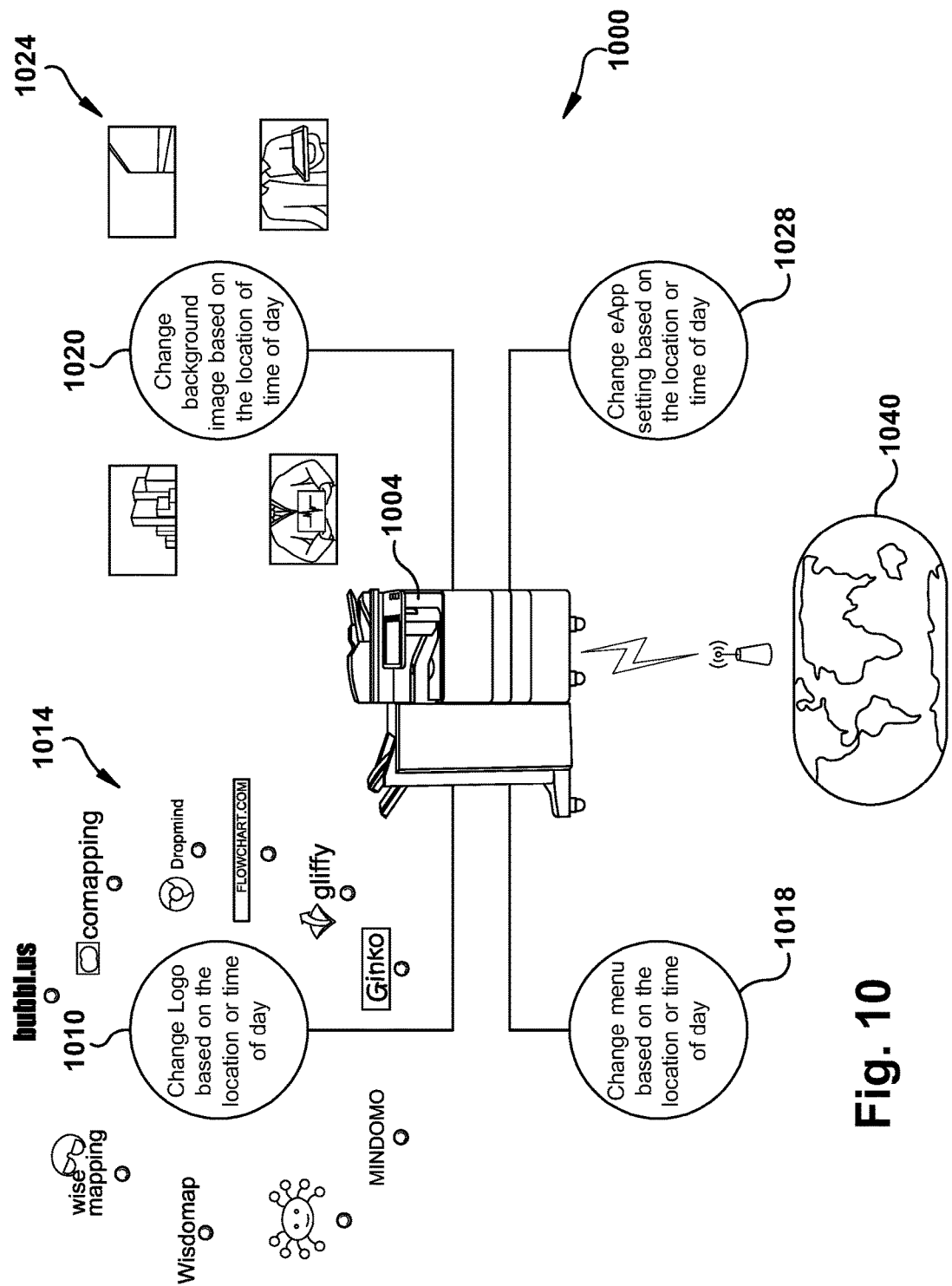
FIG. 10 is a software module block diagram for an example embodiment of a system for changing a user interface based on device location.

FIG. 10 illustrates an example embodiment of a software module block diagram 1000 for use in automated device interface customization for MFP 1004. In the illustrated example, interface changes can be made not only by device location, but also by time of day. As used herein "space-time" means a discernable state of a device, including its placement or time of day information, or environmental information, such as weather, such as current or forecast weather. Module 1010 accomplishes automated selection and installation of a displayed company logo, such as selection from logo set 1014, based on a device location or time of day. Module 1018 facilitates change in device menu options based on location or time of day. Module 1020 accomplishes a change of background images, such as one from image set 1024, based on device location or time of day. Module 1028 facilitates change in device menu options based on device location or time of day. By way of further example, a current weather map can be displayed with data obtained by any suitable weather server. Device location information is suitably accomplished by a connection to map server data 1040.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
    a print engine configured to generate a tangible document from an electronic document;
    a scan engine configured to generate an electronic document from a tangible document;
    a processor and associated memory configured to control operation of the print engine and the scan engine,
        the memory storing image data corresponding to a plurality of alternative, selectable user interface images for a display of an associated device user interface; and
    an input configured to receive device state data corresponding to a current space-time state of a digital device,
    wherein the processor is configured to select image data corresponding to at least one of the plurality of alternative images in accordance with received device state data; and
    wherein the processor is further configured to communicate selected image data for display on the device user interface.

2. The system of claim 1 wherein the device state data is comprised of a geolocation of the digital device.

3. The system of claim 1 wherein the device state data is comprised of temporal data.

4. The system of claim 3 wherein the temporal data corresponds to a time point.

5. The system of claim 1 wherein the processor is further configured to periodically select the image data.

6. The system of claim 1 wherein the alternative user interface images include a plurality of different business logos.

7. The system of claim 1 wherein the alternative user interface images include a plurality of background images.

8. A method comprising:
    storing, in a memory, image data corresponding to a plurality of alternative user interface images for display on an associated device user interface;
    receiving device state data corresponding to a current space-time state of a digital device;
    selecting image data corresponding to at least one of the plurality of alternative, selectable images in accordance with received device state data;
    communicating selected image data for display on the device user interface; and
    completing a document processing operation relative to an associated, tangible document in accordance with user operation of the device user interface including a display of the selected image.

9. The method of claim 8 further comprising receiving device state data comprised of a geolocation of the digital device.

10. The method of claim 8 further comprising receiving device state data comprised of temporal data.

11. The method of claim 10 wherein the temporal data includes a time point.

12. The method of claim 8 further comprising periodically selecting the image data.

13. The method of claim 8 wherein the selected image data includes a plurality different business logo images.

14. The method of claim 8 wherein the selected image data includes a plurality of background images.

15. A multifunction peripheral comprising:
- an intelligent controller including a processor and memory;
- a document processing engine operable on tangible documents in conjunction with instructions received from the intelligent controller;
- a document processing engine operable on instructions from the controller;
- a touchscreen user interface; and
- a space-time measurement interface configured to receive state data corresponding to a space-time state of the multifunction peripheral,
- wherein the memory is configured to store image data corresponding to a plurality of selectable alternative user interface images on the touchscreen user interface, and
- wherein the processor is configured to select at least one user interface image in accordance with state data.

16. The multifunction peripheral of claim 15 wherein the state data comprises geolocation data corresponding to a location of the multifunction peripheral.

17. The multifunction peripheral of claim 15 wherein the state data comprises a time of day.

18. The multifunction peripheral of claim 15 wherein the processor is further configured to periodically update the state data and select a user interface image in accordance with updated state data.

19. The multifunction peripheral of claim 18 wherein the processor is further configured to communicate settings data to an associated portable data device in accordance with the state data.

20. The multifunction peripheral of claim 18 wherein the user interface image includes a current weather map.

* * * * *